United States Patent
Hippert et al.

(10) Patent No.: US 11,697,175 B2
(45) Date of Patent: Jul. 11, 2023

(54) APPARATUS FOR MACHINING A WORKPIECE WITH A LASER BEAM

(71) Applicant: SYNOVA S.A., Duillier (CH)

(72) Inventors: David Hippert, Lancy (CH); Grégoire Laporte, Prilly (CH); Maximilian Epple, Assens (CH); Helgi Diehl, Morges (CH); Bernold Richerzhagen, Saint-Sulpice (CH)

(73) Assignee: SYNOVA S.A., Duillier (CH)

( * ) Notice: Subject to any disclaimer, the term of this patent is extended or adjusted under 35 U.S.C. 154(b) by 0 days.

(21) Appl. No.: 16/648,697

(22) PCT Filed: Oct. 4, 2018

(86) PCT No.: PCT/EP2018/077038
§ 371 (c)(1),
(2) Date: Mar. 19, 2020

(87) PCT Pub. No.: WO2019/068823
PCT Pub. Date: Apr. 11, 2019

(65) Prior Publication Data
US 2020/0282493 A1 Sep. 10, 2020

(30) Foreign Application Priority Data
Oct. 5, 2017 (EP) .................................. 17195003.3

(51) Int. Cl.
*B23K 26/03* (2006.01)
*B23K 26/146* (2014.01)
(Continued)

(52) U.S. Cl.
CPC .......... *B23K 26/032* (2013.01); *B05B 12/004* (2013.01); *B05B 12/082* (2013.01);
(Continued)

(58) Field of Classification Search
CPC ................ B23K 26/032; B23K 26/146; B23K 26/1476; B23K 26/03; B23K 26/1462;
(Continued)

(56) References Cited

U.S. PATENT DOCUMENTS 6,140,604 A * 10/2000 Somers ................ B23K 26/382
219/121.7
6,163,010 A * 12/2000 Kobsa ................ B23K 26/0648
219/121.84
(Continued)

FOREIGN PATENT DOCUMENTS

CN 101396768 A 4/2009
DE 102012003202 A1 8/2013
(Continued)

OTHER PUBLICATIONS

Mohring, H.C., K.M. Litwinski, O. Gummer; "Process monitoring with sensory machine tool components," CIRP Annals-Manufacturing Technology, 59 (2010), 383-386 (Year: 2010).*
(Continued)

*Primary Examiner* — Sang Y Paik
*Assistant Examiner* — Erwin J Wunderlich
(74) *Attorney, Agent, or Firm* — The H.T. Than Law Group

(57) ABSTRACT

The invention relates to an apparatus 100, 200, 300, 700 and a method 400 for machining a workpiece 101 with a laser beam 102. The apparatus 100, 200, 300, 700 comprises a machining unit 103 configured to provide a pressurized fluid jet 104 onto the workpiece 101 and to couple the laser beam 102 through at least one optical element 105 into the fluid jet 104 towards the workpiece 101. Further, it comprises a sensing unit 107 arranged to receive a laser-induced electromagnetic radiation 106 propagating away from the workpiece 101 through the fluid jet 104 and through at least one
(Continued)

optical element, and configured to convert the received radiation 106 into a signal 108. The apparatus 100, 200, 300, 700 also comprises a signal processing unit 109 configured determine a state of machining the workpiece 101 based on the signal 108.

12 Claims, 7 Drawing Sheets

(51) Int. Cl.
*B23K 26/14* (2014.01)
*B23K 26/70* (2014.01)
*B05B 12/00* (2018.01)
*B05B 12/08* (2006.01)

(52) U.S. Cl.
CPC .......... *B23K 26/03* (2013.01); *B23K 26/146* (2015.10); *B23K 26/1462* (2015.10); *B23K 26/707* (2015.10); *B23K 26/1476* (2013.01)

(58) Field of Classification Search
CPC ... B23K 26/707; B05B 12/004; B05B 12/082; H01D 5/0028
USPC ...................................................... 219/121.84
See application file for complete search history.

(56) References Cited

U.S. PATENT DOCUMENTS

| | | | |
|---|---|---|---|
| 7,273,997 B2 | 9/2007 | Lambert et al. | |
| 7,323,061 B2 | 1/2008 | Vardelle et al. | |
| 7,705,266 B2 | 4/2010 | Koseki et al. | |
| 8,134,098 B2* | 3/2012 | Muratsubaki | B23K 26/146 219/121.84 |
| 8,263,900 B2 | 9/2012 | Maehara et al. | |
| 8,525,073 B2* | 9/2013 | Quitter | B23K 26/046 219/121.75 |
| 8,581,141 B2* | 11/2013 | Muratsubaki | B23K 26/146 219/121.84 |
| 9,468,991 B2* | 10/2016 | McDowell | B23K 26/0622 |
| 9,770,785 B2* | 9/2017 | Hu | B23K 26/389 |
| 9,776,284 B2* | 10/2017 | Hu | B23K 26/0622 |
| 10,335,900 B2 | 7/2019 | Hu | |
| 10,589,385 B2 | 3/2020 | McDowell et al. | |
| 10,675,710 B2* | 6/2020 | Warashina | B23K 26/702 |
| 10,780,527 B2* | 9/2020 | Richerzhagen | B23K 26/702 |
| 11,077,521 B2* | 8/2021 | Montaron | B23K 26/38 |
| 11,318,560 B2 | 5/2022 | Richerzhagen et al. | |
| 2005/0199603 A1 | 9/2005 | Vardelle et al. | |
| 2011/0240615 A1 | 10/2011 | Suruceanu et al. | |
| 2011/0266262 A1* | 11/2011 | Denney | B23K 26/128 219/121.62 |
| 2012/0074105 A1* | 3/2012 | Okamoto | B23K 26/146 219/121.72 |
| 2012/0074110 A1* | 3/2012 | Zediker | E21B 10/60 219/121.72 |
| 2015/0209900 A1 | 7/2015 | McDowell et al. | |
| 2016/0199941 A1* | 7/2016 | McDowell | B23K 26/032 219/121.71 |
| 2017/0120337 A1* | 5/2017 | Kanko | B33Y 10/00 |
| 2017/0157709 A1 | 6/2017 | Richerzhagen et al. | |
| 2018/0161930 A1 | 6/2018 | Warashina | |
| 2020/0298336 A1* | 9/2020 | Diboine | B23K 26/705 |
| 2021/0053151 A1 | 2/2021 | Anderegg et al. | |
| 2021/0107089 A1* | 4/2021 | Mazouer | B23K 26/146 |

FOREIGN PATENT DOCUMENTS

| | | | | |
|---|---|---|---|---|
| EP | 2960006 A1 * | 12/2015 | | B23K 26/146 |
| JP | H11254161 A | 9/1999 | | |
| JP | 3147459 | 3/2001 | | |
| JP | 2005125398 A | 5/2005 | | |
| JP | 2009000698 A | 1/2009 | | |
| JP | 2009190082 A | 8/2009 | | |
| JP | 2009241138 A * | 10/2009 | | |
| JP | 2009241138 A | 10/2009 | | |
| JP | 2010115680 A | 5/2010 | | |
| JP | 2011064503 A | 3/2011 | | |
| JP | 2011212710 A | 10/2011 | | |
| WO | 9956907 A1 | 11/1999 | | |
| WO | WO-1999056907 A1 * | 11/1999 | | |
| WO | 2012031009 A1 | 3/2012 | | |

OTHER PUBLICATIONS

Machine English Translation of EP-2960006-A1 (Year: 2015).*
Machine English Translation of JP-2009241138-A (Year: 2009).*
Machine English Translation of WO-1999056907-A1 (Year: 1999).*
Examination Report issued in connection with the corresponding Indian Patent Application No. 202047009417 dated Jul. 2, 2021.
International Search Report and Written Opinion issued in connection with the corresponding International Application No. PCT/EP2018/077038 dated Apr. 9, 2019.
Machine translation of JP 3147459 to Watanabe et al.
English translation of Chinese Office Action issued in connection with the corresponding Chinese Application No. 20188064929.7 dated Jun. 30, 2021.
Machine translation of CN 101396768 A to Murasubaki et al.
European Office Action issued in connection with the corresponding European Application No. 17 195 003.3 dated Sep. 3, 2020.
Machine translation of JP 2011212710 to Keiichi et al.
Machine translation of JP 2011064503 to Koji.
Machine translation of JP 2010115680A to Hidenobu et al.
Machine translation of JP2005125398 A to Hirotaka.
Machine translation of JPH11254161 A to Makoto.
Machine translation of JP 2009000698 A to Oasako Sadanobu.
Machine translation of JP 2009241138 A to Muratsubaki Ryoji et al.
Machine translation of JP 2009190082 A to Sasaki Motoi et al.
Machine translation of DE 102012003202 A1 to Saegmueller et al.
Translated excerpts of the office actions issued in connection with the related Japanese patent applications.
European Office Action issued in connection with the corresponding European Patent Application No. 18 780 129.5 dated Jan. 3, 2023.

* cited by examiner

APPARATUS FOR MACHINING A WORKPIECE WITH A LASER BEAM

TECHNICAL FIELD

The present invention relates to an apparatus for machining a workpiece with a laser beam, and to a corresponding machining method. In particular, the apparatus and method are for machining the workpiece with a laser beam coupled into a fluid jet. The present invention specifically relates to controlling the machining process of the apparatus and method based on a process emission.

BACKGROUND

A conventional apparatus for machining a workpiece with a laser beam is known. Also a conventional apparatus for machining a workpiece with a laser beam coupled into a fluid jet, wherein the fluid jet impinges onto the workpiece, is generally known.

A problem typically encountered during the laser beam machining process of a conventional apparatus is that, due to the lack of mechanical interactions of the apparatus with the workpiece, it is difficult to determine characteristic states of the process of machining the workpiece. This difficulty often leads to a significant increase of the machining process time. For example, when a conventional apparatus is used to cut a workpiece with the laser beam, it is problematic to accurately determine, if and when the laser beam has broken through the workpiece material. Thus, the cutting process cannot be finished in a time-optimized manner. Additionally, it would also be beneficial to have the possibility to accurately determine other states of machining the workpiece, for example, states that indicate an instability of the machining process.

Since the laser beam may be scattered back from the workpiece in an uncontrolled manner, a determination of the process state by visual inspection of the workpiece is difficult or even dangerous. Further, if the conventional apparatus uses a laser beam guided in a fluid jet, additional difficulties arise due to the wet workpiece environment. For instance, since the fluid jet may splatter back from the workpiece in an uncontrolled manner, the fluid may accumulate on surface regions of the workpiece, thereby making it even more difficult to determine states of the machining process.

Conventional solutions are largely based on visual inspection by means of a camera, for instance, disposed next to the apparatus and/or the workpiece. However, the conventional visual inspection is not very precise, due to the above-mentioned environmental difficulties, especially in wet environments. Further, there is a high risk that the inspection equipment, e.g. the camera, is damaged by splattering fluids. Moreover, the apparatus according to this conventional solution is relatively large, and is inconveniently distributed into multiple separate components.

In view of these problems and disadvantages, the present invention aims at improving the conventional apparatus and solutions. It is accordingly an object of the present invention to provide an apparatus and a method for machining a workpiece with a laser beam coupled into a fluid jet, which allow reducing the machining process time. In particular, the invention should allow determining more precisely a state of the machining process. The higher the accuracy of determining the state of machining the workpiece is, the better the machining process can be time-optimized. In particular, the invention desires a reliable determination of whether the laser beam has broken through the workpiece material or not. The present invention thereby aims particularly for a compact apparatus and a solution, which is not disturbed by the wet environment caused by the fluid jet. Accordingly, damages to the apparatus and equipment should be avoided.

SUMMARY OF THE INVENTION

The object of the present invention is achieved by the solution provided in the enclosed independent claims. Advantageous implementations of the present invention are defined in the dependent claims.

In particular, the present invention proposes detecting a state of machining the workpiece based on a process emission, i.e. based on a laser-induced electromagnetic radiation that results from the machining of the workpiece with the laser beam.

A first aspect of the present invention provides an apparatus for machining a workpiece with a laser beam, the apparatus comprising a machining unit configured to provide a pressurized fluid jet onto the workpiece and to couple the laser beam through at least one optical element into the fluid jet towards the workpiece, a sensing unit arranged to receive a laser-induced electromagnetic radiation propagating away from the workpiece through the fluid jet and through at least one optical element, and configured to convert the received radiation into a signal, a signal processing unit configured determine a state of machining the workpiece based on the signal.

In the machining unit the laser beam is coupled into the pressurized fluid jet, which acts like a waveguide for the laser beam and guides the laser beam onto the workpiece by means of total internal reflection. The pressurized fluid jet is preferably provided by a fluid nozzle, and the laser beam may be directed by the at least one optical element through the fluid nozzle into the fluid jet and towards the workpiece. The fluid nozzle and the at least one optical element may be separated, for instance by an optical window, in order to prevent contact of the optical element and the fluid.

The sensing unit may be a photo-detecting device or light sensor, and is preferably positioned such that it can detect the laser-induced electromagnetic radiation that travels along the fluid jet in the direction opposite to the primary laser beam, i.e. propagates away from the workpiece. Notably, some electromagnetic radiation induced by the laser beam machining the workpiece may not back-propagate through the fluid jet, but may travel elsewhere.

The laser-induced electromagnetic radiation received by the sensing unit provides a very accurate fingerprint of different states of machining the workpiece. In particular, the signal, which is accordingly output by the sensing unit, shows characteristic behaviors depending on the different states of machining the workpiece. Therefore, the signal processing unit is able to accurately and efficiently determine states of machining the workpiece based on the signal. As a consequence, it may trigger according actions of the apparatus based on the determined state, in order to significantly improve the machining process time.

The fact that the sensing unit can receive the laser-induced electromagnetic radiation via the fluid jet allows arranging it safe from the wet environment of the machining process. Advantageously, the fluid jet acts as a waveguide also for back-propagating laser-induced radiation, and thus allows a more accurate detection of this radiation, and consequently an analysis or post-processing of the signal that the sensing unit supplies when sensing this radiation. Preferably, the sensing unit is housed in the apparatus, more preferably such that it is separated from any fluid circuitry and the fluid nozzle, in order to be protected from fluid contact and thus enjoy an increased lifetime. The apparatus of the first aspect can be built in a very compact manner, and all components of the apparatus may advantageously be integrated.

In a preferred implementation form of the apparatus, the signal processing unit is configured to determine, as the state of machining the workpiece, whether the laser beam has broken through the workpiece.

The apparatus of the invention can particularly determine very accurately and quickly, whether the laser beam has broken through the workpiece. Accordingly, the machining process time can be significantly reduced, particularly when the apparatus is used for cutting a workpiece with the laser beam. This is due to the fact that the machining process can be stopped immediately, once the state that the laser beam has broken through the workpiece is determined. The signal processing unit may be configured to automatically provide such an instruction.

In a further preferred implementation form of the apparatus, the sensing unit is arranged to receive the laser-induced electromagnetic radiation propagating through the fluid jet through the at least one optical element, which is configured to couple the laser beam into the fluid jet.

In this specific way, the apparatus can be built particularly compact. Furthermore, the least amount of optical components are required.

The apparatus may comprises an optical head including the machining unit and the sensing unit. Accordingly, in the optical head the laser beam can be coupled by the machining unit into the fluid jet, and the sensing unit may sense the laser-induced radiation back-propagating from the workpiece. The signal processing unit may in this case be arranged in the apparatus, e.g. in a housing thereof, but outside the optical head. A laser unit comprising laser source and/or laser controller may be part of the apparatus or not, but is at least separate from the optical head.

In a further preferred implementation form of the apparatus, the apparatus comprises an optical head including the machining unit, and a laser unit including the sensing unit.

The laser unit may comprise laser source and/or laser controller. In this implementation form, the laser beam may be provided by the laser unit to the optical head, where it is coupled into the fluid jet by the machining unit. Laser-induced radiation back-propagating from the workpiece may be guided through the optical head to the laser unit, where it is received by the sensing unit. The optical head can be optically connected to the laser unit, for instance, by an optical fiber.

It was surprisingly found that the state of machining the workpiece can be determined precisely by the signal processing unit based on the signal, which is provided by the sensing unit based on the received laser-induced radiation, even when the sensing unit is arranged in the laser unit, i.e. distanced from the optical head. An advantage of having the sensing unit 107, and optionally associated optical elements like a beam splitter, optical separation unit, and/or focusing optics etc., provided in the laser unit is that the handling of these elements, and e.g. their maintenance or replacement, becomes easier. A further advantage is that the optical head can be exchanged without having to exchange the sensing unit and associated optical elements. The optical head can also be built smaller, and the sensing unit and associated optical elements can be built larger, due to more space available in the laser unit.

In a further preferred implementation form of the apparatus, the apparatus further comprises an optical connection element, particularly an optical fiber, for optically connecting the optical head and the laser unit, wherein the machining unit in the optical head is configured to receive the laser beam via the optical connection element, and the sensing unit in the laser unit is configured to receive the laser-induced electromagnetic radiation via the optical connection element.

Accordingly, the same optical connection element, e.g. optical fiber, is used to transport the laser light for the laser beam and the laser-induced radiation, respectively, within the apparatus, i.e. between the optical head and the laser unit. Nevertheless, the state of machining the workpiece can be accurately determined by the processing unit based on the signal produced accordingly by the sensing unit.

In a further preferred implementation form of the apparatus, the at least one optical element includes a lens for coupling the laser beam into the fluid jet, and the sensing unit is arranged to receive the back-propagating laser-induced electromagnetic radiation through said lens.

This specific implementation form therefore allows using the lens in a double manner and allows positioning the sensing unit such that it is protected from fluid contact. Further, the apparatus can be built in a compact manner.

In a further preferred implementation form of the apparatus, the apparatus further comprises a spectral separation unit, preferably an optical filter unit, configured to isolate only electromagnetic radiation of interest including at least a part of the laser-induced electromagnetic radiation on the sensing unit and/or to prevent initial laser light to reach the sensing unit.

In particular, the spectral separation unit is arranged and configured to receive a radiation, which is or includes the laser-induced electromagnetic radiation propagating away from the workpiece, may separate electromagnetic radiation of interest from the received radiation, and may provide the radiation of interest including at least a part of said laser-induced electromagnetic radiation to the sensing unit. The spectral separation unit has the effect that the state of machining the workpiece can be determined even more accurately and more reliably. The spectral separation unit prevents that unwanted radiation reaches the sensing unit. The sensing unit can therefore more sensitively and accurately detect the radiation of interest. The radiation of interest may be the laser-induced electromagnetic radiation with unwanted other radiation removed, or may be a part of the laser-induced electromagnetic radiation. It may, for instance, be that the laser beam induces different kinds of electromagnetic radiation caused by different mechanisms. In this case, the radiation of interest may be only laser-induced electromagnetic radiation caused by one specific mechanism.

In a further preferred implementation form of the apparatus, the laser-induced electromagnetic radiation includes secondary radiation emitted from a portion of the workpiece that is machined with the laser beam.

The secondary radiation is in this case caused by the processing of the workpiece with the laser beam, for instance, because the machined surface region of the workpiece is transformed into a plasma. This plasma emits a characteristic radiation, which can be easily isolated on or by the sensing unit, for instance, on the sensing unit by means of the above-described spectral separation unit, in order to allow a particularly accurate determination of the state of machining the workpiece, especially of whether the laser beam broke through the workpiece.

In a further preferred implementation form of the apparatus, the laser-induced electromagnetic radiation includes primary laser radiation that is reflected from the workpiece.

This provides a simple way of implementing the present invention. The laser light reflected back from the workpiece includes at least a part of the light of the primary laser beam, and back-propagates through the fluid jet towards the sensing unit. The corresponding signal converted by the sensing unit provides an accurate fingerprint of the state of machining the workpiece, especially of whether the laser beam broke through the workpiece.

In a further preferred implementation form of the apparatus, the laser-induced electromagnetic radiation includes secondary radiation generated by scattering, preferably Raman scattering, of the laser beam in the fluid jet.

Laser-induced scattering within the fluid jet has the advantage that it is not created directly at the workpiece surface, where the environmental conditions are less controlled, but in the laminar and/or better controlled fluid jet. Nevertheless, this scattering-induced radiation provides an accurate fingerprint of the state of machining the workpiece, especially of whether the laser beam broke through the workpiece.

It may be the case that secondary radiation emitted from a portion of the workpiece that is machined with the laser beam, primary laser radiation that is reflected from the workpiece, and/or secondary radiation generated by scattering of the laser beam in the fluid jet propagates away from the workpiece through the fluid jet and through the at least one optical element. In this case, the above-described spectral separation unit may be used to filter out any unwanted laser-induced electromagnetic radiation, and to focus only the laser-induced electromagnetic radiation of interest, e.g. the secondary radiation emitted from a portion of the workpiece that is machined with the laser beam, onto the sensing unit.

In a further preferred implementation form of the apparatus, the signal processing unit is configured to process the signal with a temporal resolution of below 0.5 s, preferably of below 0.1 s.

For instance, the temporal resolution of the signal processing unit may be between 0.2-0.5 s, or between 0.1-0.5 s, or between 0.1-0.2 s, or even between 0.01 s-0.1 s. These preferred temporal resolutions provided by the signal processing unit allow an accurate detection of the state of machining the workpiece, and thus a particularly stable control of the machining process. In particular, the machining process time can be reduced even further with such a signal processing unit.

In a further preferred implementation form of the apparatus, the laser beam is a pulsed laser beam, the sensing unit is configured to convert the received radiation into a signal for each laser pulse, and the signal processing unit is configured to integrate a plurality of signals over time to produce an integrated signal, and to determine the state of machining the workpiece based on a pattern or a change of a pattern in the integrated signal.

Integrating the signal over time improves further the reliability of determining the state of machining the workpiece. In particular, patterns that occur in a single (non-integrated) signal can be enhanced in the integrated signal. Furthermore, additional patterns that appear only in the integrated signal may allow determining further states, or determining the states more precisely. Also the sensitivity of the determination is generally enhanced, since the signal noise impact is reduced.

In a further preferred implementation form of the apparatus, the apparatus further comprises at least one peripheral device, preferably a laser controller, fluid supply controller, gas supply controller, and/or movement axes controller, wherein the signal processing unit is configured to provide the at least one peripheral device with an instruction signal based on the determined state of machining the workpiece, in order to start, break, stop and/or restart an action of the peripheral device.

Accordingly, the machining process time can be optimized. In particular, based on the determined state of machining the workpiece, the apparatus can react quickly to take the necessary actions. For instance, if the laser beam broke through the workpiece, the apparatus can stop the machining process. As a further advantage, the machining process quality can be improved.

A second aspect of the present invention provides a method of machining a workpiece with a laser beam, the method comprising providing a pressurized fluid jet onto the workpiece and coupling the laser beam through at least one optical element into the fluid jet towards the workpiece, receiving a laser-induced electromagnetic radiation propagating away from the workpiece through the fluid jet and through at least one optical element, and converting the received radiation into a signal, and determining a state of machining the workpiece based on the signal.

With the method of the second aspect, the same advantages and effects can be achieved as with the apparatus of the first aspect.

In a preferred implementation form of the method, the method further comprises, for determining the state of machining the workpiece, recording a plurality of signals, comparing the recorded signals with predetermined reference signals, and determining the state of machining the workpiece based on similar or matching reference signals.

By providing reference signals and carrying out the comparison with these reference signals, an easy implementation with very accurate results can be provided.

In a further preferred implementation form of the method, the method further comprises, for determining the state of machining the workpiece, integrating a plurality of signals over time to produce an integrated signal, evaluating a pattern or a change of a pattern in the integrated signal, and determining the state of machining the workpiece based on the pattern or the change of the pattern.

Thereby, the same advantages and effects as with the respective above-described implementation form of the apparatus are achieved.

In a further preferred implementation form of the method, the laser-induced electromagnetic radiation is secondary radiation emitted from a portion of the workpiece that is machined with the laser beam, and the method comprises determining, as the state of machining the workpiece, that the laser beam has broken through the workpiece, when a value of a single signal or the integrated signal, which increased after a start of machining the workpiece, decreases again below a determined threshold value.

In a further preferred implementation form of the method, the laser-induced electromagnetic radiation is primary laser radiation reflected from the workpiece, and the method comprises determining, as the state of machining the workpiece, that the laser beam has broken through the workpiece, when a value of a single signal or the integrated signal, which decreased after a start of machining the workpiece, increases again above a determined threshold value.

The above-mentioned characteristic fingerprints in the single signal or integrated signal, i.e. the patterns followed by the signal or integrated signal, have been found to provide very accurate determination results. Moreover, the processing load is low, so that the method can be carried out very quickly.

BRIEF DESCRIPTION OF DRAWINGS

The above-described aspects and preferred implementation forms of the present invention are explained in the following description of specific embodiments in relation to the enclosed drawings, in which.

DETAILED DESCRIPTION OF EMBODIMENTS

Figure 1:
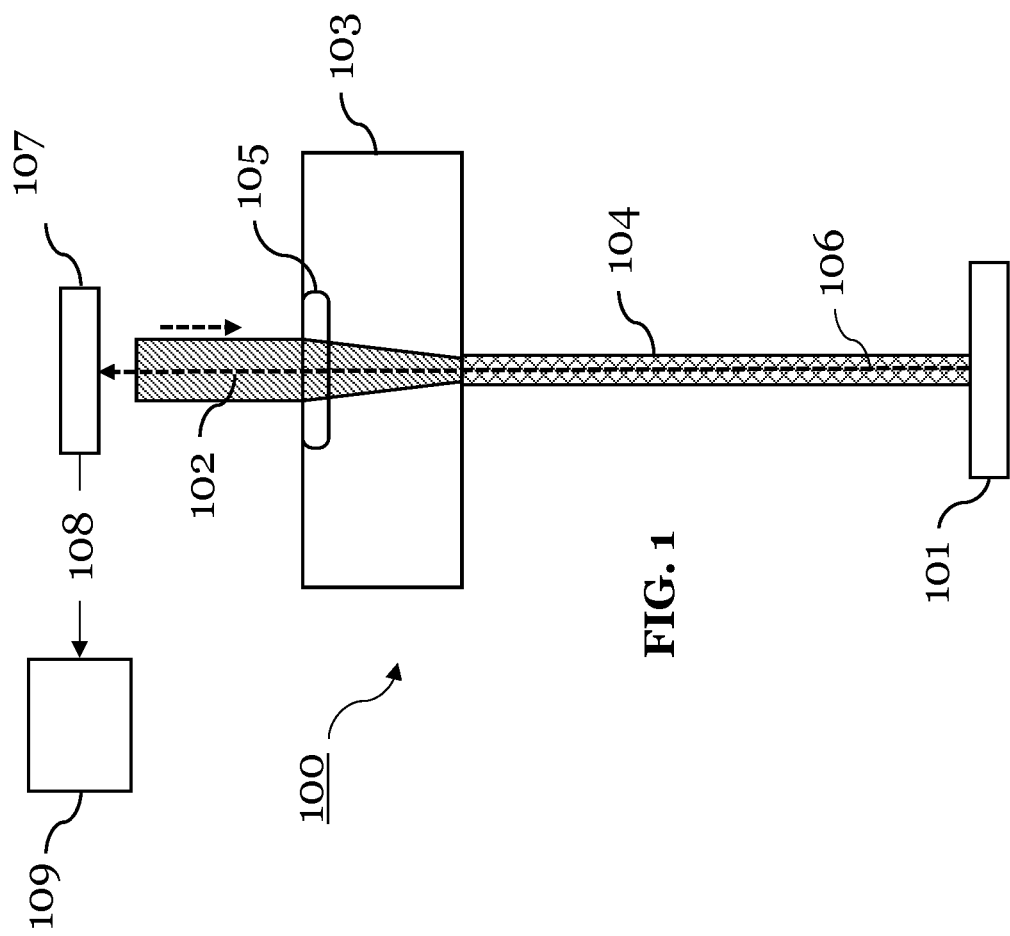
FIG. 1 shows an apparatus according to an embodiment of the present invention.

FIG. 1 shows an apparatus 100 according to an embodiment of the present invention. In particular, the apparatus 100 is configured to machine a workpiece 101 with a laser beam 102. The workpiece 101 may be a made of a material including, for example, metals, ceramics, diamonds, semiconductors, carbides, alloys, superalloys, or ultra-hard materials. The workpiece 101 is notably not a part of the apparatus 100. However, the workpiece 101 can be positioned on a machining surface, which may or may not be part of the apparatus 100. In either case, the apparatus 100 can be arranged such that it can machine the workpiece 101 disposed on the machining surface. The apparatus 100 may also control movements of the machining surface in up to three dimensions.

The apparatus 100 comprises a machining unit 103, a sensing unit 107, and a signal processing unit 109. These units 103, 107 and 109 of the apparatus 100 are preferably all integrated into the apparatus 100, i.e. they are preferably disposed within a housing or enclosure of the apparatus 100. The apparatus 100 may also comprise further units also disposed within the same housing or enclosure.

The machining unit 103 is configured to provide a pressurized fluid jet 104 onto the workpiece 101, and to couple the laser beam 102 into the fluid jet 104. In particular, the laser beam 102 is coupled into the fluid jet 104 by means of at least one optical element 105. This at least one optical element 105 may include, for example, one or more lenses, lens assemblies, light guiding optics, beam splitters, mirrors, filters, or polarizers. The laser beam 102 is guided by the preferably thin (i.e. having a diameter in the µm range) fluid jet 104, in principle like it would be guided in an optical fiber. The laser beam 102 is, for instance a pulsed laser beam 102 and is directed towards and onto the workpiece 101, and can thus be used to precisely machine the workpiece 101, while the fluid jet 104 continually cools the workpiece 101 and potentially removes debris. For instance, the apparatus 100 may specifically be configured to accurately cut or shape the workpiece 101.

The laser beam 102 is provided by a laser, which may be a part of the apparatus or which may be external but couple the laser beam 102 into a laser supply port of the apparatus 100. The laser beam 102 may be visible, and is preferably from the green spectrum. For instance, the laser beam 102 may have a wavelength of 532 nm.

The sensing unit 107 is arranged to receive laser-induced electromagnetic radiation 106, i.e. an electromagnetic emission that occurs when the workpiece 101 is machined with the laser beam 102. Thus, the laser-induced electromagnetic radiation 106 may also be referred to as "process emission". The sensing unit 107 is arranged such that it can receive, and thus sense, the laser-induced electromagnetic radiation 106 propagating away from the workpiece 101 through the fluid jet 104 and through at least one optical element. Accordingly, the back-propagating process emission 106 can reach the sensing unit 107 guided in and by the fluid jet 104. The at least one optical element, through which the sensing unit 107 can receive the process emission 106 can be the at least one optical element 105, which is used to couple the laser beam 102 into the fluid jet 104. This is exemplarily shown in FIG. 1.

The sensing unit 107 is further configured to convert the received laser-induced electromagnetic radiation 106 into a signal 108, for instance, it provides a photo current as output signal. The sensing unit 107 may thus, for example, be a photo-detector, but it can also be any other device or light sensor that is able to convert at least the electromagnetic radiation of interest into an electrical signal. The signal 108 is provided to the signal processing unit 109 for further analysis and/or processing.

The signal processing unit 109 is, for example, realized by a microprocessor or computer, and is specifically configured to determine a state of machining the workpiece 101 based on the signal 108, which it receives from the sensing unit 107. In particular, the signal processing unit 109 is configured to determine, as the state of machine the workpiece 101, whether the laser beam 102 has broken through the workpiece 101. In other words, it can determine that and when the laser beam 102 breaks through the workpiece 101. To this end, the signal processing unit 109 may apply signal processing on the signal 108. Signal processing may include, for example, scaling, averaging, recording over time, integrating over time, or converting the signal 108, and may include comparing the signal 108 or an integrated signal with one or more reference signals. For instance, the signal processing unit 109 may be configured to record a plurality of signals 108, and to compare the recorded signals 108 with pre-stored reference signals. The signal processing unit 109 may alternatively or additionally be configured to integrate a plurality of signals 108 over time to produce an integrated signal, and to evaluate a pattern or a change of a pattern in the integrated signal. The plurality of signals 108 may in each case arise from laser-pulse induced electromagnetic radiation 106 sensed by the sensing unit 107, if the laser beam 102 is a pulsed laser beam.

The signal processing unit 109 may then be configured to determine the state of machining the workpiece 101 based on similar or matching reference signals (in the first case) or based on the pattern or the change of the pattern (in the second case). Preferably, the signal processing unit 109 provides a temporal resolution of below 0.5 s, preferably of below 0.2 s, more preferably of below 0.1 s, since preferably the sensing unit 107 is operated with at least 10 Hz, more preferably with at least 15 Hz.

Figure 2:
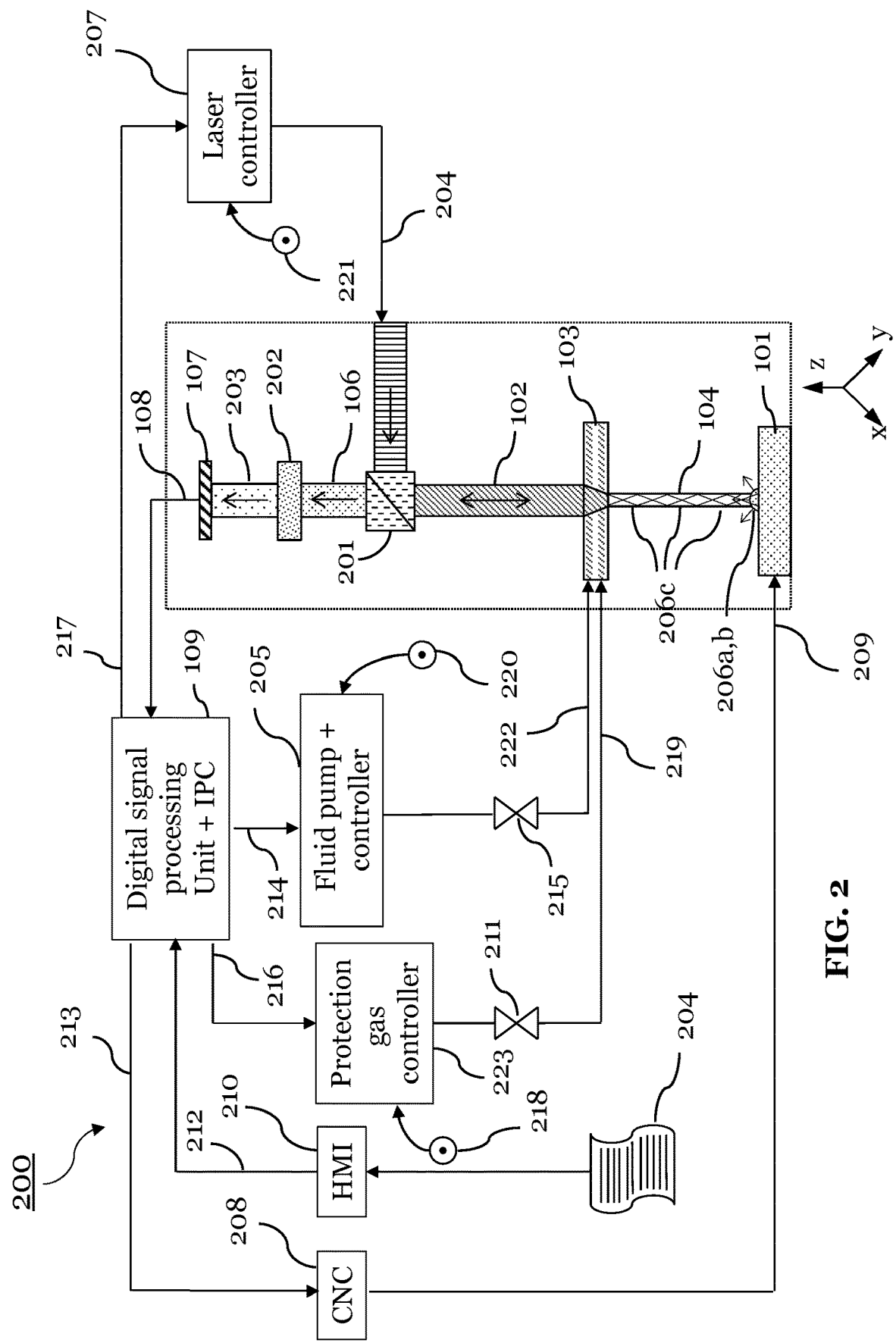
FIG. 2 shows an apparatus according to an embodiment of the present invention.

FIG. 2 shows an apparatus 200 according to an embodiment of the present invention, which builds on the apparatus 100 shown in FIG. 1. Identical elements in FIG. 2 and FIG. 1 are labeled with the same reference signs and function likewise. Accordingly, the apparatus 200 of FIG. 2 includes the machining unit 103, which is configured to provide the pressurized fluid jet 104 onto the workpiece 101, and to couple the laser beam 102 into the fluid jet 104. It also includes the sensing unit 107, which is configured to receive a back-propagating laser-induced electromagnetic radiation 106 via the fluid jet 104 and through the machining unit 103, preferably through the at least one optical element 105, and to convert it into the signal 108. The signal processing unit 109 (here referred to as "Digital signal processing unit+I PC", i.e. the signal processing unit 109 may also provide inter-process communications (IPC)) is again configured to determine a state of machine the workpiece 101 based on the signal 108. FIG. 2 additionally shows further details about the preferred overall layout of the apparatus 200. The apparatus 200 of FIG. 2 especially includes several peripheral devices.

The apparatus 200 may include a laser source 221 and a laser controller 207 for controlling the laser source 221. The laser source 221 is configured to supply 204 the laser light for the laser beam 102. The laser source 221 may also be an external device not included in the apparatus 200 but for supplying 204 the laser light to a laser supply port of the apparatus 200. In the apparatus 200 the laser beam 102 is preferably directed by an optical unit 201 of the apparatus 200, which is preferably a beam splitter and preferably arranged in the optical path between the machining unit 103 and the sensing unit 107, towards the machining unit 103. In the machining unit 103, the laser beam 102 is coupled into the fluid jet 104. Notably, also the back-propagating laser-induced electromagnetic radiation 106 passes preferably through this optical unit 201, but is directed towards the sensing unit 107.

The apparatus 200 includes preferably also a spectral separation unit 202, which is configured to isolate only electromagnetic radiation of interest 203 including laser induced-electromagnetic radiation 106 on the sensing unit 107. The spectral separation unit 202 is preferably arranged in the optical path between the machining unit 103 and the sensing unit 107, such that it can receive laser-induced electromagnetic radiation 106 travelling away from the workpiece 101 through the fluid jet 104 and through the at least one optical element 105, and can output the radiation of interest 203, which includes at least a part of the received laser-induced electromagnetic radiation 106, onto the sensing unit 107. The spectral separation unit 202 may be an optical filter unit, which may consist of one or more optical filters and is configured to filter out unwanted electromagnetic radiation, i.e. to prevent electromagnetic radiation of certain (unwanted) wavelengths from reaching the sensing unit 107. The electromagnetic radiation of interest 203 may particularly be only the laser-induced electromagnetic radiation 106, wherein other electromagnetic radiation that accidently reaches the spectral separation unit 202 (and would reach the sensing unit 107 without the spectral separation unit 202) is filtered out. The electromagnetic radiation of interest 203 may also be a part of the laser-induced electromagnetic radiation 106 that reaches the spectral separation unit 202 (and would reach the sensing unit 107 without the spectral separation unit 202), wherein laser-induced electromagnetic radiation that is not of interest is filtered out. If the laser-induced electromagnetic radiation is or includes secondary radiation, the spectral separation unit 202 may be configured to prevent laser light reaching the sensing unit 107. That is, the spectral separation unit 202 may be configured to filter out light of the same wavelength than provided by the laser source 221. There are specifically three mechanisms envisaged by the invention, which produce laser-induced electromagnetic radiation 106 of interest that can provide an accurate fingerprint of the state of machining the workpiece 101.

Firstly, the laser-induced electromagnetic radiation 106 may be or include secondary radiation 206a that is emitted from the portion of the workpiece 101 that is machined with the laser beam 102. The machined surface portion of the workpiece 101 may, for instance, be transformed into a plasma by the laser beam 102, which plasma is the source of the secondary radiation 206a. Typically, this secondary radiation 206a is from the yellow and/or orange spectrum. Accordingly, the spectral separation unit 202 may in this case be configured to allow light from the yellow and/or orange spectrum to reach the sensing unit 107, while it blocks light from other parts of the spectrum, especially blocks the laser light e.g. from the green spectrum. Thus, the radiation of interest 203 may include only the secondary radiation 206a. The sensing unit 107 can in this case be configured to be particularly sensitive to the yellow and/or orange spectrum.

Secondly, the laser-induced electromagnetic radiation 106 may be or include primary laser radiation 206b reflected from the workpiece 101, especially from the workpiece surface. Since the laser light is preferably from the green spectrum, the spectral separation unit 202 may in this case be configured to allow light from the green spectrum to reach the sensing unit 107, while it blocks light from other parts of the spectrum. Thus, the radiation of interest 203 may include only the secondary radiation 206b. The sensing unit 107 can in this case be configured to be particularly sensitive to the green spectrum.

Thirdly, the laser-induced electromagnetic radiation 106 may be or include secondary radiation 206c generated by scattering of the laser beam 102 in the fluid jet 104. Particularly, this secondary radiation 206c can be caused by Raman scattering of the laser beam 102. Typically, this secondary radiation 206c is from the red spectrum. Accordingly, the spectral separation unit 202 may in this case be configured to allow light from the red spectrum to reach the sensing unit 107, while it blocks light from other parts of the spectrum, especially the laser light e.g. from the green spectrum. Thus, the radiation of interest 203 may include only the secondary radiation 206c. The sensing unit 107 can in this case be configured to be particularly sensitive to the red spectrum.

Notably, both the secondary radiation 206a and the laser reflection 206b originate from the workpiece 101, particularly from the machined workpiece surface portion, while the secondary radiation 206c originates from the fluid jet 104, particularly from one or several different locations along the fluid jet 104.

The apparatus 200 can further include several peripheral devices, and the signal processing unit 109 is preferably configured to provide one or more of the peripheral devices with instruction signals based on the determined state of machining the workpiece 101. In this manner, the signal processing unit 109 can control the peripheral devices in dependence of the determined state, and can for example instruct these peripheral devices to start, break, stop and/or restart their respective actions.

For example, the apparatus 200 shown in FIG. 2 includes as peripheral devices a laser controller 207, a fluid supply controller (here optionally integrated with a fluid pump) 205, a gas supply controller 223 (here a "Protection gas controller", since the gas is preferably used to protectively surround the fluid jet 104), and a movement axes controller 208 (here a "Computer Numerical Control (CNC)"), which may be configured to move in perpendicular X, Y and Z directions and/or rotational a, b, c directions a machining surface, onto which the workpiece 101 is put, or alternatively the workpiece 101 itself.

The signal processing unit 109 is configured to provide respective instruction signals to the different peripheral devices. Preferably, the signal processing unit 109 can control the laser controller 207 via a signal 217, the fluid supply controller 205 via a signal 214, the gas supply controller 223 via a signal 216, and the movement axes controller 208 via a signal 213. The signal processing unit 109 preferably controls the peripheral devices independently from another, and without any outside input, but only based on the signal 108 and the determined state of machining the workpiece 101. Nevertheless, it is additionally possible that the apparatus 200 includes a human machine interface 210, which can receive human/script input 204, in order to provide additional instructions to the signal processing unit 109 via a signal 212.

According to the instructions provided by the signal processing unit 109 based on the determined state of machining the workpiece 101, the peripheral devices can take instructed actions. For instance, the laser controller 207 may start, pause or stop the supply of laser light for the laser beam 102. The fluid supply controller 205 may control a fluid pressure control valve 215, in order to start, break or stop a supply 222 of fluid, which is preferably water, to the machining unit 103. The gas supply controller 223 can control a protection gas control valve 211, in order to start, break or stop a supply 219 of gas, which is preferably helium, to the machining unit 103. The movement axes controller 208 may provide specific movement of the workpiece 101, i.e. it can control a machining surface, onto which the workpiece 101 is disposed.

Figure 3:
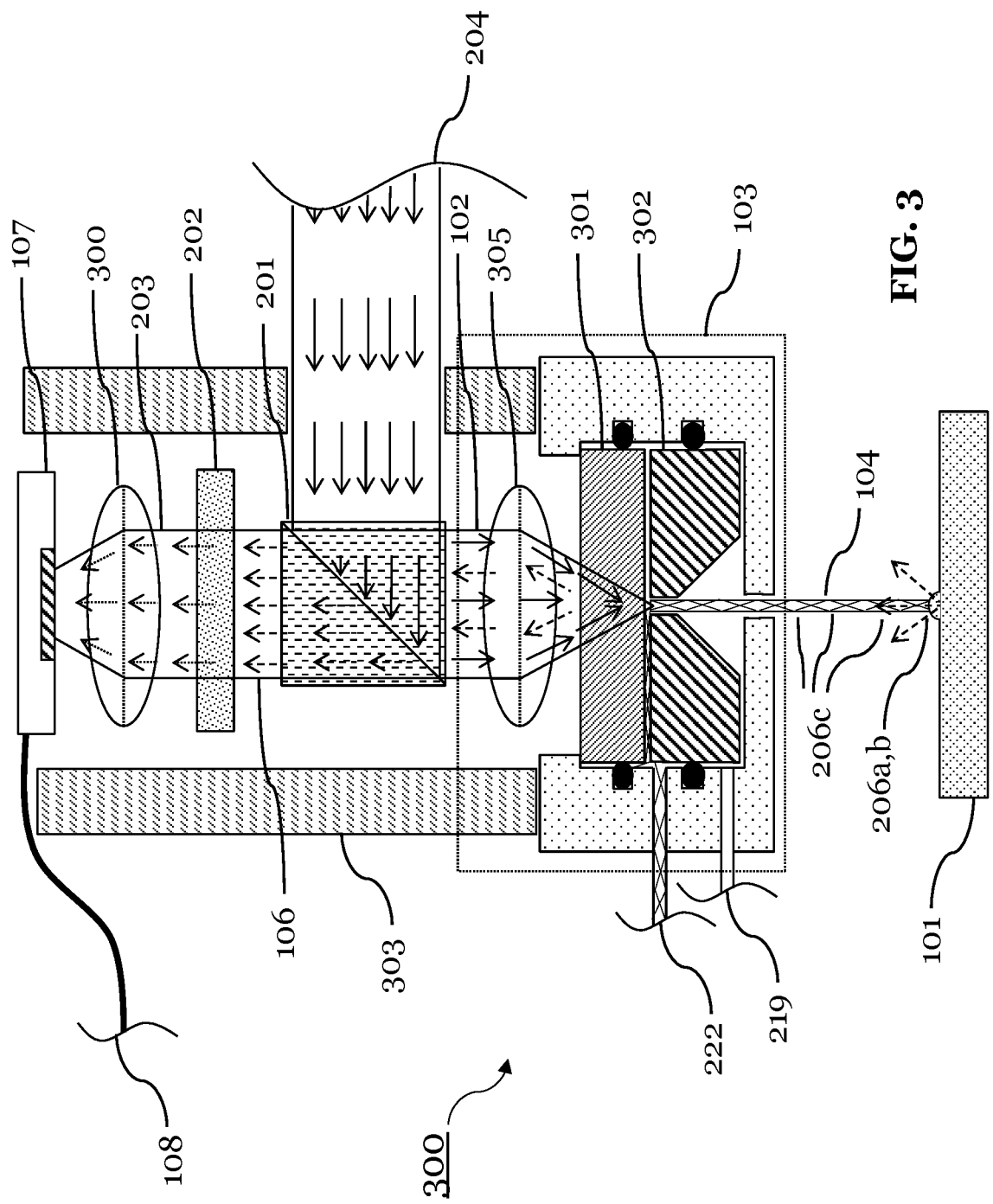
FIG. 3 shows an apparatus according to an embodiment of the present invention.

FIG. 3 shows an apparatus 300 according to an embodiment of the present invention, which builds on the apparatus 100 shown in FIG. 1 and the apparatus 200 shown in FIG. 2. Identical elements in FIG. 3 and in FIG. 1 and/or FIG. 2 are labeled with the same reference signs and function likewise. In particular, FIG. 3 illustrates more details about the optical arrangement and fluid circuitry of the apparatus 300, particularly as provided in the machining unit 103. The machining unit 103 may particularly include a lens 305 for coupling the laser beam 102 into the fluid jet 104. Also back-propagating laser-induced electromagnetic radiation 106 is preferably transferred through the fluid jet 104 via this lens 305, and then further towards the sensing unit 107. Thereby, the radiation 106 preferably travels from the lens 305 through the optical unit 201 to the spectral separation unit 202, and further as radiation of interest 203 including at least a part of the radiation 106 to the sensing unit 107.

The machining unit 103 may also include an optically transparent protection window 301, in order to separate the optical arrangement, here exemplarily the lens 305, from the fluid circuitry and the region of the machining unit 103 where the fluid jet 104 is produced. For producing the fluid jet 104, the machining unit 103 preferably includes a fluid nozzle 302. This fluid nozzle 302 is provided with the fluid via the fluid supply 222, which may be implemented as a channel through the housing or enclosure of the apparatus 300. To this end, the fluid nozzle 302 includes a fluid aperture, which defines the width of the fluid jet 104. The aperture has preferably a diameter of 10-200 μm, and the fluid jet 104 has preferably a diameter of about 0.6-1 times the fluid aperture. The pressure for the pressurized fluid jet 104 is provided via the fluid supply 222. Preferably, the pressure is between 50-800 bar.

It can also be seen in FIG. 3 that a protection gas, preferably helium, can be supplied via gas supply 219 into the machining unit 103, particularly into a space provided within the machining unit 103, through which the generated fluid jet 104 passes after leaving the fluid nozzle 302. Here, the protection gas can protectively envelop the fluid jet 104, before the fluid jet 104 exits the machining unit 103 through a lower exit aperture, and then travels further towards and onto the workpiece 101.

The apparatus 300 shown in FIG. 3 also includes focusing optics 300 preferably arranged in the optical path between spectral separation unit 202 and sensing unit 107 and for directing light on the sensing unit 107. In particular, the laser-induced electromagnetic radiation 106, which back-propagates through the fluid jet 104 through the lens 305, preferably passes the optical unit 201, then the optical separation unit 202, and the remaining filtered electromagnetic radiation of interest 203 is focused by the focusing optics 300 onto the sensing unit 107, particularly onto a light-sensitive area of the sensing unit 107. The focusing optics 300 preferably includes or is at least one lens, but may also include or be another optical element like a parabolic mirror. The sensing unit 107 is configured to convert the received filtered radiation of interest 203 into the signal 108 for further analysis and/or processing by the signal processing unit 109 (which is not shown here).

FIG. 3 also shows that the above-described elements of the apparatus 300 may be provided within an enclosure, particularly within an optical head 303. That is, the apparatus 300 may further comprises the optical head 303, which may include the machining unit 103 and the sensing unit 107. The optical head 303 may also include the optical unit 201, the spectral separation unit 202, and/or the focusing optics 300.

Figure 4:
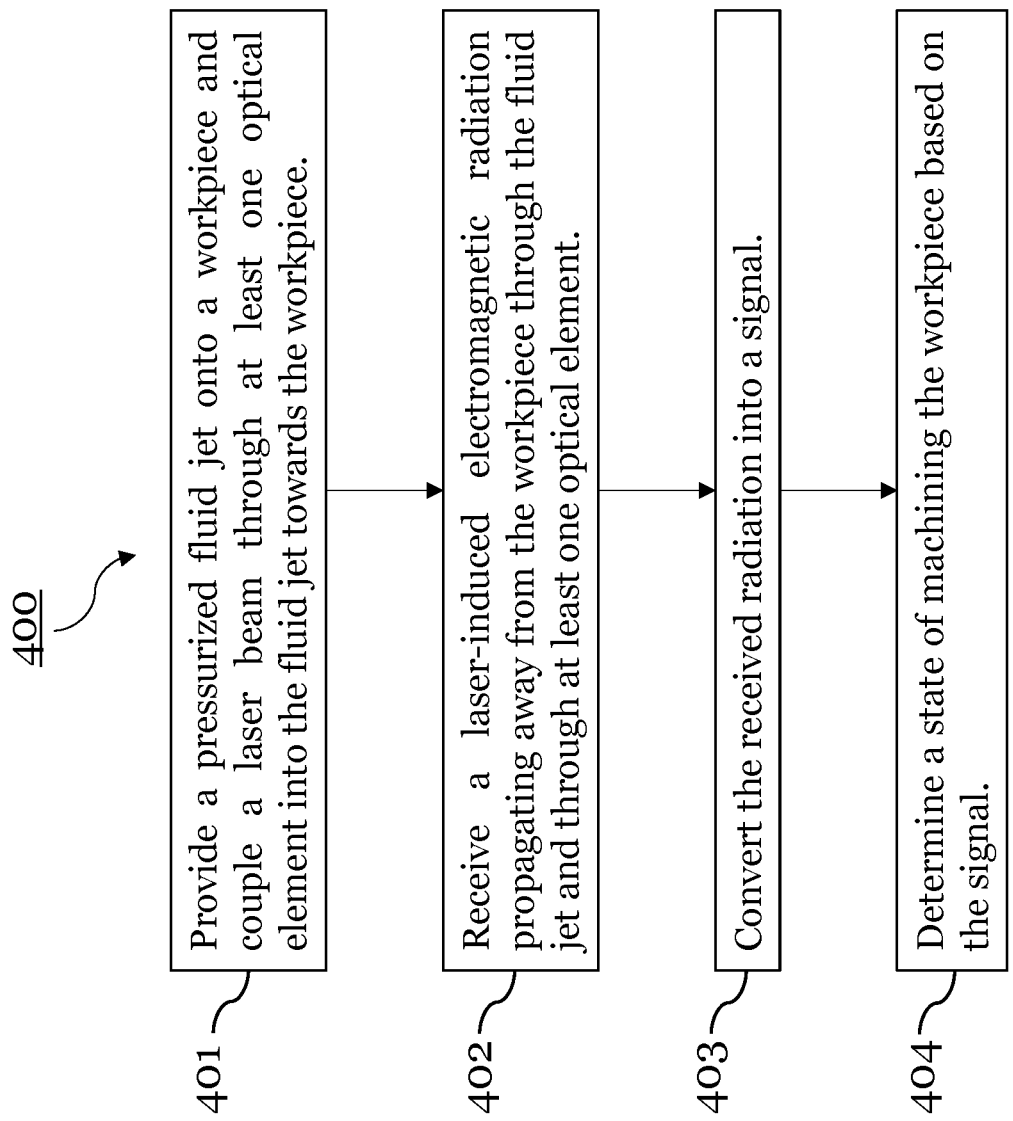
FIG. 4 shows a method according to an embodiment of the present invention.

FIG. 4 shows a method 400 according to an embodiment of the present invention. The method 400 includes a step 401 of providing a pressurized fluid jet 104 onto a workpiece 101 and coupling a laser beam 102 through at least one optical element 105 into the fluid jet 104 towards the workpiece 101. Further, the method 400 includes a step 402 of receiving a laser-induced electromagnetic radiation 106 propagating away from the workpiece 101 through the fluid jet 104 and through at least one optical element, preferably the at least one optical element 105 used for coupling the laser beam 102 into the fluid jet 104. Further, the method 400 includes a step 403 of converting the received radiation into a signal 108. Finally, the method 400 includes a step 404 of determining a state of machining the workpiece based on the signal 108.

The method 400 may be carried out by the apparatus 100, 200 or 300 shown in the FIGS. 1, 2 and 3, respectively. In particular, step 401 may be carried out by the machining unit 103, the steps 402 and 403 by the sensing unit 107, and step 404 by the signal processing unit 109.

The method 400 may particularly include an automated time-recording of multiple signals 108, wherein each signal 108 may be caused by one of a plurality of laser pulses. That is, the laser beam 102 is a pulsed laser beam. The laser pulses may be provided regularly and may be in the order of ns. Each signal 108 may be represented by a single numeric value or by a sequence of values as a function of time. Multiple obtained signals 108 may also be integrated over time to produce an integrated signal. The method 400 may further include an automated comparison of the obtained signals 108 with reference signals, which are read out from a reference storage e.g. from a memory of the signal processing unit 109. The method 400 then may include evaluating a pattern or a change of a pattern in the obtained signals 108 or integrated signal, and may determine the state of machining the workpiece 101 based on said pattern or change of the pattern. Optionally, the method 400 may include the automated generation of instruction signals or instruction codes and subsequent transmission to one or more peripheral devices, so that these peripheral devices start, break, stop or restart their respective actions.

Figure 5:
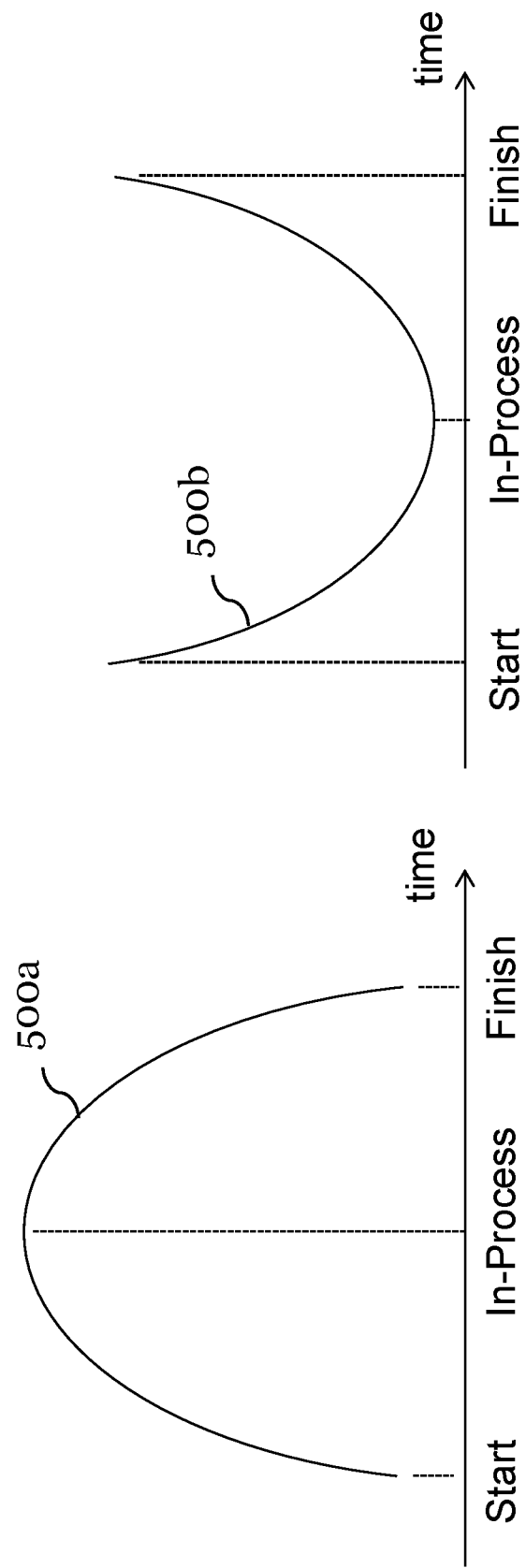
FIG. 5 schematically shows characteristic signal patterns used in a method according to an embodiment of the present invention.

FIG. 5 schematically shows two specific signal patterns 500a and 500b, which are preferably used in the method 400 (or by the signal processing unit 109 of the apparatus 100, 200, 300), in order to determine the state of machining the workpiece 101.

In particular, the left-hand side signal pattern 500a is preferably used, if the laser-induced electromagnetic radiation 106 is or includes the above-mentioned secondary radiation 206a emitted from a portion of the workpiece 101 that is machined with the laser beam 102. The signal pattern 500a indicates that the laser beam has broken through the workpiece 101, when the signal 108 or the integrated signal first increases after the "Start" of machining the workpiece 101 towards an "In-Process" time section, and then decreases again after the "In-Process" time section. When the signal 108 or integrated signal falls below a determined threshold value, the "Finish" of the process is reached, i.e. it can be determined that the laser beam broke through the workpiece 101.

Likewise, the right-hand signal pattern 500b is preferably used, if the laser-induced electromagnetic radiation 106 is or includes primary laser radiation 206b reflected from the workpiece 101. The signal pattern 500b indicates that the laser beam has broken through the workpiece 101, when the signal 108 or the integrated signal first decreases after the "Start" of machining the workpiece 101 towards an "In-Process" time section, and then increases again from the "In-Process" time section. When the signal 108 or integrated signal rises above a determined threshold value, the "Finish" is reached, i.e. the laser beam broke through the workpiece 101.

Figure 6:
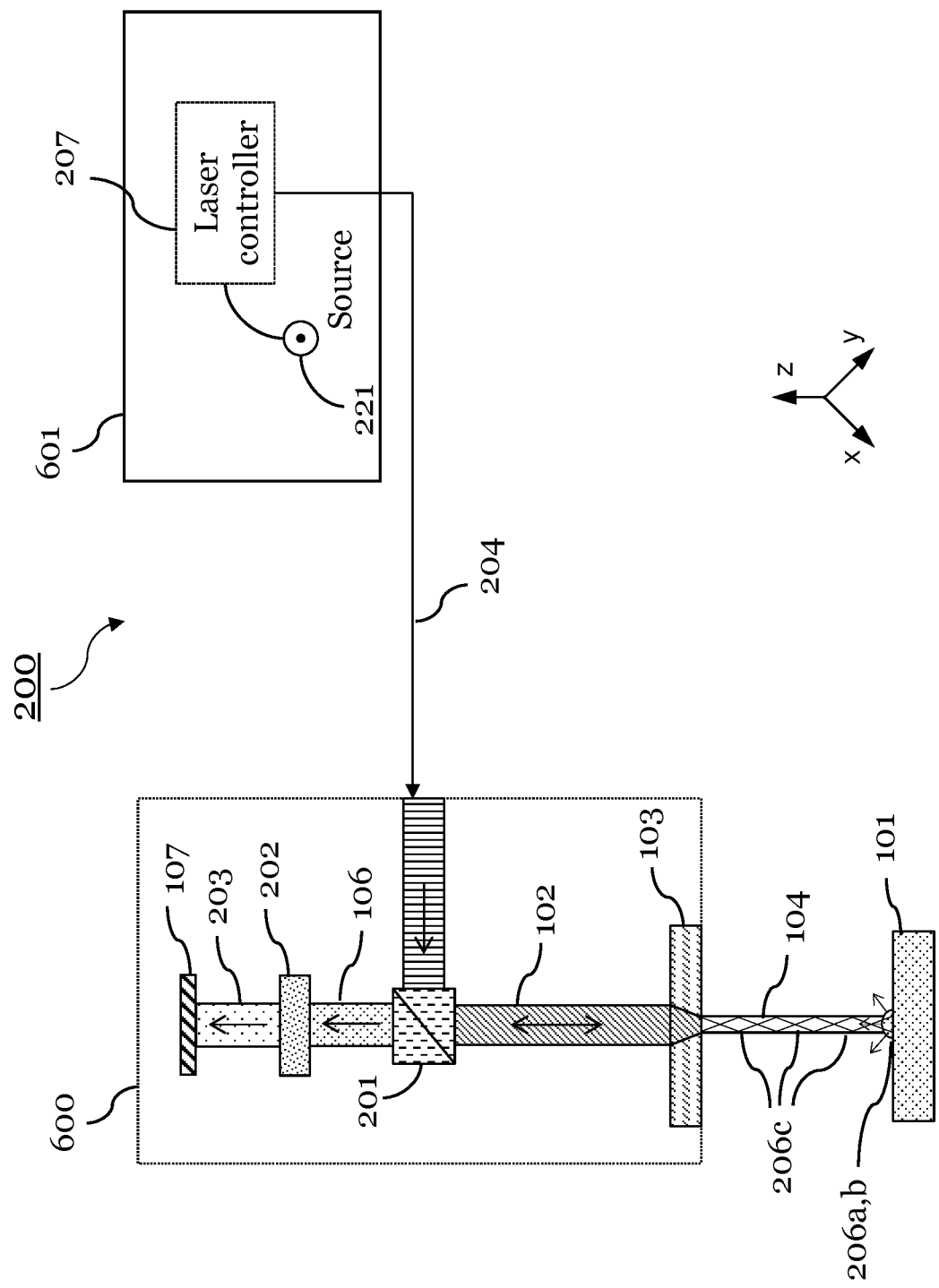
FIG. 6 shows an apparatus according to an embodiment of the present invention.

FIG. 6 shows an apparatus 200 according to an embodiment of the present invention, which builds on the apparatus 200 shown in FIG. 2. Identical elements in FIG. 2 and FIG. 6 are labeled with the same reference signs and function likewise.

FIG. 6 shows in particular that the apparatus 200 may further include an enclosure, particularly and optical head 600, which may include the machining unit 103 and the sensing unit 107. The optical head 600 may consequently include also the optical unit 201 and the spectral separation unit 202. As described already with respect to FIG. 2, the laser light for the laser beam 102 may be provided 204 by a laser unit 601 (comprising laser source 201 and/or laser controller 207), for instance via an optical fiber and to a laser supply port of the apparatus 200 (if the laser unit 601 is not part of the apparatus 200) or to the optical head 600, e.g. to a laser supply port of the optical head 600 (if the laser unit 601 is part of the apparatus 200).

Figure 7:
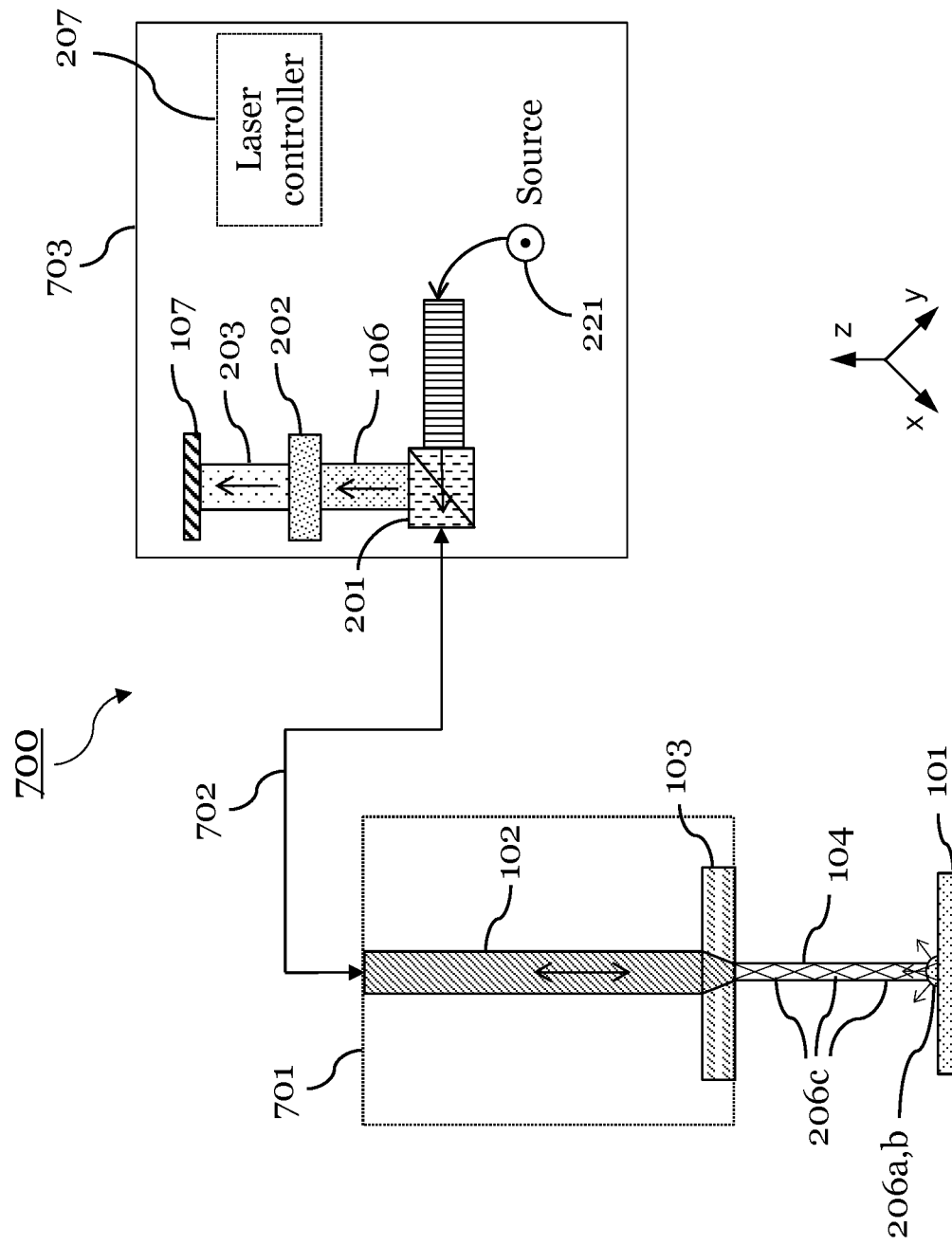
FIG. 7 shows an apparatus according to an embodiment of the present invention.

FIG. 7 shows an apparatus 700 according to an embodiment of the invention, which builds on the apparatus 100 shown in FIG. 1 and has elements in common with the apparatus 200 of FIG. 2 and FIG. 6. Identical elements in FIG. 7 and in FIGS. 1, 2 and/or 6 are labeled with the same reference signs and function likewise.

The apparatus 700 of FIG. 7 has a different configuration than the apparatus 200 shown in FIG. 6. In particular, the apparatus 700 comprises an optical head 701, which includes the machining unit 103. However, the optical head 701 does not comprise the sensing unit 107. The sensing unit 107 is provided in a laser unit 703 (including laser source 221 and/or laser controller 207). Notably, the laser unit 703 may be formed by the laser controller 207 being provided in the laser source 221 or vice versa. The laser unit 703 is part of the apparatus 700. The machining unit 103 in the optical head 701 is configured to couple the laser beam 102 into the fluid jet 104. The sensing unit 107 in the laser unit 703 is configured to receive the laser-induced electromagnetic radiation 106 (e.g. secondary radiation 206a emitted from a portion of the workpiece 101 that is machined with the laser beam 102, or primary laser radiation 206b reflected from the workpiece 101, or secondary radiation 206c generated by scattering of the laser beam 102 in the fluid jet 104).

The apparatus 700 comprises also an optical connection element 702, particularly an optical fiber 702, optically connecting the optical head 701 and the laser unit 703. The laser unit 703 is configured to provide the laser light for the laser beam 102, which is transported through the optical connection element 702 to the optical head 701, e.g. to a supply port of the optical head 701, where it is further provided to the machining unit 103, which couples it into the fluid jet 104. Laser-induced electromagnetic radiation 106 is received via the fluid jet 104 by the machining unit 103, and is further provided through the optical head 701 and through the optical connection element 702 to the laser unit 703, e.g. to a supply port of the laser unit 703, where it is further provided to the sensing unit 107, which converts it into the signal 108.

The laser unit 703 may accordingly comprise also the optical unit 201, which is preferably a beam splitter and is preferably arranged in the optical path between laser source 222 and optical connection element 702, in order to provide the laser light for the laser beam 102 from the laser source 221 to the optical connection element 702. Also the back-propagating laser-induced electromagnetic radiation 106 may pass through this optical unit 201, but is then directed towards the sensing unit 107. The laser unit 703 may also include the spectral separation unit 202, which is configured to isolate only electromagnetic radiation of interest 203 including laser induced-electromagnetic radiation 106 on the sensing unit 107. The spectral separation unit 202 is preferably arranged in the optical path between the optical unit 201 and the sensing unit 107, such that it receives the laser-induced electromagnetic radiation 106 from the optical unit 201 and provides the radiation of interest 203 onto the sensing unit 107.

In summary, the present invention provides an apparatus 100, 200, 300 and 700, and a method 400, that enable machining a workpiece 101 with a laser beam 102 coupled into a fluid jet 104, wherein due to accurate determination of a state of the machining process, the machining process time can significantly be reduced.

The present invention has been described in conjunction with various embodiments as examples as well as implementation forms. However, other variations can be understood and effected by those persons skilled in the art and practicing the claimed invention, from the studies of the drawings, the description and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. Apparatus (100, 200, 300, 700) for machining a workpiece (101) with a laser beam (102), the apparatus (100, 200, 300, 700) comprising
a laser configured to provide the laser beam (102), wherein the laser includes a light sensor;
a machining head including a nozzle (302) and a lens (305);
an optical fiber optically connecting the machining head and the laser; and
a computer (109)
wherein the nozzle (302) is configured to provide a pressurized liquid jet (104) onto the workpiece (101), wherein the liquid jet (104) has a diameter in the micrometer range;
wherein the lens (305) is configured to receive the laser beam (102) via the optical fiber from the laser, and to couple the laser beam (102) into the liquid jet (104) towards the workpiece (101);
wherein the light sensor (107) in the laser is configured to receive, during the machining of the workpiece (101) with the laser beam (102), a back-propagating laser-induced electromagnetic secondary radiation (206a, 206c) and to convert the received secondary radiation (206a, 206c) into a signal (108), wherein the back-propagating secondary radiation (206a, 206c) is guided in and by the liquid jet (104) and through the lens (305) for coupling the laser beam (102) into the liquid jet (104); and
wherein the computer (109) configured to determine based on the signal (108), during the machining of the workpiece (101) with the laser beam (102), whether the laser beam (102) has broken through the workpiece (101).

2. Apparatus (200, 300, 700) according to claim 1 further, comprising
an optical filter unit included in the laser and configured to isolate only electromagnetic radiation of interest (203) including at least a part of the secondary radiation (206a, 206c) on the light sensor (107) and/or to prevent initial laser light (102) to reach the light sensor (107).

3. Apparatus (100, 200, 300, 700) according to claim 1 wherein
the secondary radiation (206a) is emitted from a portion of the workpiece (101) that is machined with the laser beam (102); and
the computer (109) is configured to determine that the laser beam (102) has broken through the workpiece (101), when a value of the signal (108), which increased after a start of machining the workpiece (101), decreases again below a determined threshold value.

4. Apparatus (100, 200, 300, 700) according to claim 1, wherein
the secondary radiation (206c) is generated by scattering of the laser beam (102) in the liquid jet (104).

5. Apparatus (100, 200, 300, 700) according to claim 1, wherein
the computer (109) is configured to process the signal (108) with a temporal resolution of below 0.5 s.

6. Apparatus (100, 200, 300, 700) according to claim 1, wherein
the laser beam (102) is a pulsed laser beam,
the light sensor (107) is configured to convert the received secondary radiation into a signal (108) for each laser pulse, and
the computer (109) is configured to integrate a plurality of signals (108) over time to produce an integrated signal, and to determine whether the laser beam (102) has broken through the workpiece (101) based on the integrated signal.

7. Apparatus (200, 300, 700) according to claim 1, further comprising
at least one peripheral device (207, 205, 223, 208) including at least one of a laser controller (207), a liquid supply controller (205), a gas supply controller (223), and a movement axes controller (208),
wherein the computer (109) is configured to provide the at least one peripheral device (207, 205, 223, 208) with an instruction signal (217, 214, 216, 213) based on whether the laser beam (102) has broken through the workpiece (101), in order to start, break, stop and/or restart an action of the at least one peripheral device (207, 205, 223, 208).

8. The apparatus of claim 1, wherein an aperture of the nozzle (302) has a diameter from 10 µm to 200 µm.

9. The apparatus of claim 8, wherein the liquid jet has a diameter from 0.6 to 1 times the diameter of the aperture of the nozzle (302).

10. Method (400) using the apparatus of claim 1 for machining the workpiece (101) with the laser beam (102), the method comprising the steps of:
providing (401) the pressurized liquid jet (104) onto the workpiece (101) and coupling the laser beam (102) through the lens (305) into the liquid jet (104) towards the workpiece (101), wherein the liquid jet (104) has the diameter in the micrometer range,
receiving (402), during the machining of the workpiece (101) with the laser beam (102), the back-propagating secondary radiation (206a, 206c), and converting (403) the received secondary radiation (206a, 206c) into the signal (108), wherein the back-propagating secondary radiation (206a, 206c) is guided in and by the liquid jet (104) and through the lens (305) used for coupling the laser beam (102) into the liquid jet (104), and
determining (404), during the machining of the workpiece (101) with the laser beam (102) based on the signal (108), whether the laser beam (102) has broken through the workpiece (101).

11. Method (400) according to claim 10, further comprising, for determining (404) whether the laser beam (102) has broken through the workpiece (101),
integrating a plurality of signals (108) over time to produce an integrated signal,
evaluating a pattern (500a, 500b) or a change of a pattern (500a, 500b) in the integrated signal, and
determining whether the laser beam (102) has broken through the workpiece (101) based on the pattern (500a, 500b) or the change of the pattern (500a, 500b).

12. Method (400) according to claim 11, wherein
the secondary radiation (206a) is emitted from a portion of the workpiece (101) that is machined with the laser beam (102), and the method (400) comprises
determining (404), as the state of machining the workpiece (101), that the laser beam (102) has broken through the workpiece (101), when a value of a single signal (108) or the integrated signal, which increased after a start of machining the workpiece (101), decreases again below a determined threshold value.

\* \* \* \* \*